(12) United States Patent
Dudley

(10) Patent No.: US 6,970,653 B1
(45) Date of Patent: Nov. 29, 2005

(54) FIBEROPTIC SYSTEM FOR COMMUNICATING BETWEEN A CENTRAL OFFICE AND A DOWNSTREAM STATION

(75) Inventor: Thomas J. Dudley, Andover, MA (US)

(73) Assignee: Coretek, Inc.

(*) Notice: Subject to any disclaimer, the term of this patent is extended or adjusted under 35 U.S.C. 154(b) by 523 days.

(21) Appl. No.: 09/761,054

(22) Filed: Jan. 15, 2001

(51) Int. Cl.[7] ............... H04B 10/26; H04B 10/207; H04J 14/08
(52) U.S. Cl. ............... 398/169; 398/72; 398/98; 398/153; 398/167.5; 398/168
(58) Field of Search ............... 398/169, 168, 398/67, 72, 107, 108, 170, 10, 79, 21, 318; 359/237; 385/24

(56) References Cited

U.S. PATENT DOCUMENTS

| | | | | |
|---|---|---|---|---|
| 4,134,008 A | * | 1/1979 | de Corlieu et al. | 398/170 |
| 4,712,859 A | * | 12/1987 | Albanese et al. | 385/24 |
| 5,377,026 A | * | 12/1994 | Liu et al. | 349/37 |
| 5,408,350 A | * | 4/1995 | Perrier et al. | 398/168 |
| 5,608,565 A | * | 3/1997 | Suzuki et al. | 359/237 |
| 6,108,112 A | * | 8/2000 | Touma | 398/10 |
| 6,411,410 B1 | * | 6/2002 | Wright et al. | 398/79 |
| 6,650,840 B2 | * | 11/2003 | Feldman | 398/21 |

OTHER PUBLICATIONS

Ramaswami, R. and K.N. Sivarajan. Optical Networks: A Practical Perspective. San Francisco: Morgan Kaufmann Publishers, Inc., 1998.*

Murphy, E.J. et al. "Simultaneous single-fibre transmission of video and bidirectional voice/data using LiNbO3 guided-wave devices." Journal of Lightwave Technology, vol. 6, No. 6, Jun. 1988: 937-945.*

* cited by examiner

*Primary Examiner*—Jason Chan
*Assistant Examiner*—David S. Kim
(74) *Attorney, Agent, or Firm*—Steubing McGuinness & Manaras LLP

(57) ABSTRACT

A fiber optic system for communicating between a central office and a downstream station is described. The central office has a TX unit, an RX unit and a continuous wave ("CW") laser. Each station has an RX unit and a tunable filter coupling the RX unit to the central office. During downstream transmission, the station's tunable filter is tuned to the central office TX wavelength so that the signal transmitted by the central office will pass through the filter and be received by the station's RX unit. During upstream transmission, the station's tunable filter is selectively tuned to a wavelength different than the CW laser wavelength, allowing selective reflection of light from the CW laser back to the central office. The tunable filter can thus be used to modulate the reflected light to effectively create an upstream transmission from the downstream station to the central office.

5 Claims, 3 Drawing Sheets

UPSTREAM TRANSMISSION IN TDM MODE

FIBEROPTIC SYSTEM FOR COMMUNICATING BETWEEN A CENTRAL OFFICE AND A DOWNSTREAM STATION

FIELD OF THE INVENTION

This invention relates to fiberoptic systems in general, and more particularly to fiberoptic systems for communicating between a central office and a downstream station.

BACKGROUND OF THE INVENTION

An ATM-PON ("Asynchronous Transfer Mode"—"Passive Optical Network") architecture has been developed for the cost-effective deployment of optical fiber in an access network, whereby to permit communications between a central office and a downstream station. The ATM-PON architecture uses bi-directional transmission between the central office and the downstream station, with 1.5 μm being the wavelength for the downstream transmission and 1.3 μm being the wavelength for the upstream transmission. Passive Optical Network ("PON") refers to the use of splitters/combiners to passively split or combine optical signals without requiring conversion of those optical signals to corresponding electrical signals.

In the ATM-PON architecture, all downstream stations have access to the same bandwidth. Downstream transmission is in a broadcast mode, while upstream transmission is in a time division multiplex ("TDM") mode, with each downstream station being assigned a specific time slot for sending its upstream signal to the central office.

SUMMARY OF THE INVENTION

An object of the present invention is to provide an improved fiberoptic system for communicating between a central office and a downstream station.

In accordance with the present invention, there is provided a novel system wherein the central office has a transmitter ("TX") unit, a receiver ("RX") unit and a continuous wave ("CW") laser, and each downstream station has an RX unit and a tunable filter. The downstream station's tunable filter is placed between its RX unit and the central office. During downstream transmission, the station's tunable filter is tuned to the wavelength of the central office's TX unit so that the signal transmitted by the central office will pass through the filter and be received by the station's RX unit. During upstream transmission, the station's tunable filter is selectively tuned to a wavelength different than the wavelength of the central office's CW laser, so that the station's tunable filter will selectively reflect light from the CW laser back to the central office. In particular, by selectively tuning the station's tunable filter, the tunable filter can be used to modulate the light being reflected back to the central office, whereby to effectively create an upstream transmission from the downstream station to the central office.

BRIEF DESCRIPTION OF THE DRAWINGS

These and other features of the present invention will be more fully disclosed by the following detailed description of the invention, which is to be considered together with the accompanying drawings wherein.

DETAILED DESCRIPTION OF THE PREFERRED EMBODIMENT

Figure 1:
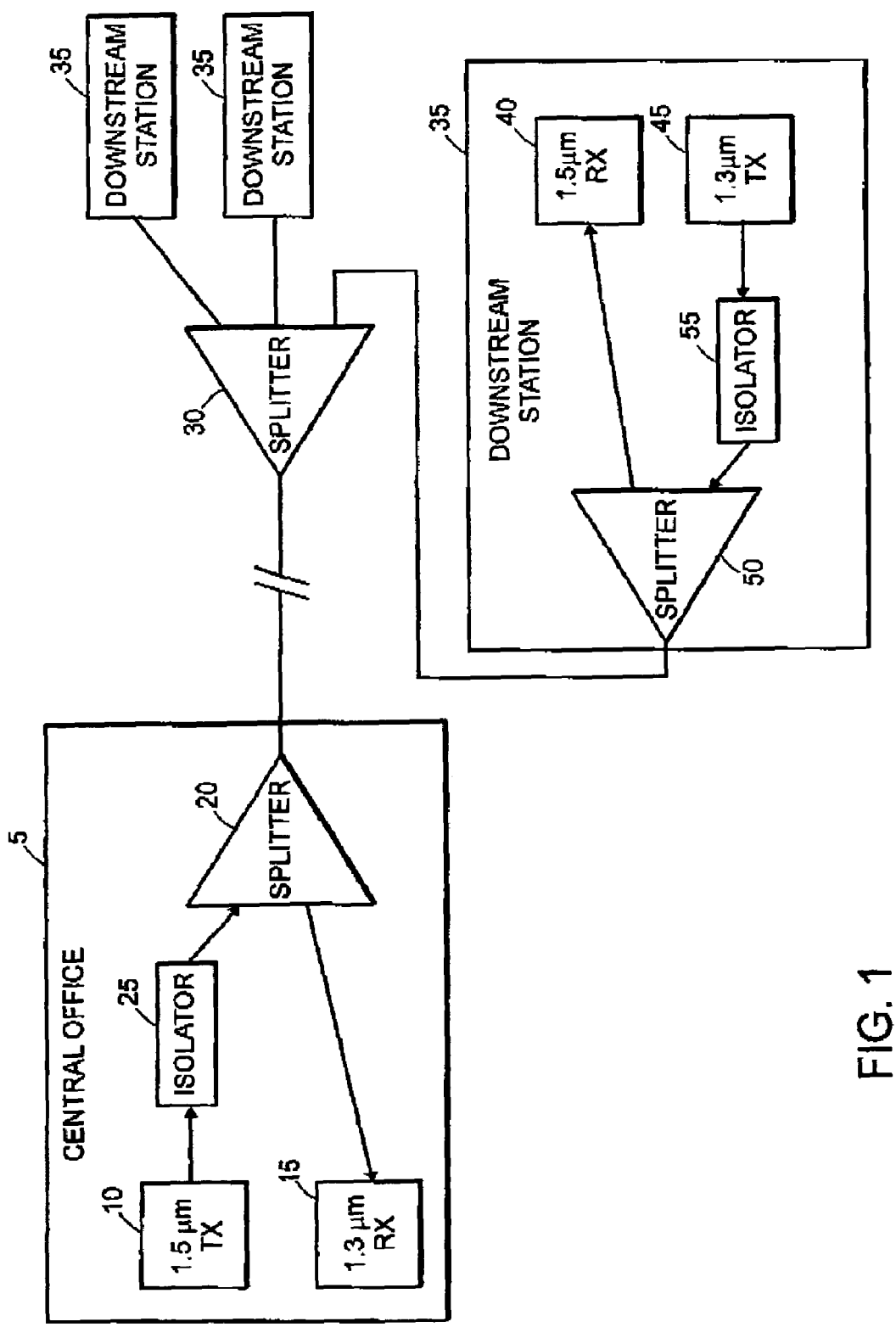
FIG. 1 is a schematic diagram of the aforementioned ATM-PON architecture.

Looking now at FIG. 1, in the ATM-PON architecture, the central office 5 has a 1.5 μm TX unit 10, a 1.3 μm RX unit 15 and a splitter/combiner ("splitter") 20. An isolator 25 is generally placed between TX unit 10 and splitter 20. At the downstream end, a splitter 30 is used to connect a plurality of downstream stations 35. Each downstream station 35 has a 1.5 μm RX unit 40, a 1.3 μm TX unit 45, and a splitter 50. Again, an isolator 55 is generally placed between TX unit 45 and splitter 50.

As noted above, in the ATM-PON architecture, downstream transmission is in a broadcast mode, while upstream transmission is in TDM mode, with each downstream station being assigned a specific time slot for sending its upstream signal to the central office. More particularly, during downstream transmission, the central office's 1.5 μm TX unit 10 transmits a signal and this signal is received at every downstream station 35 using 1.5 μm RX units 40. During upstream transmission, a downstream station's 1.3 μm TX unit 45 transmits a signal and this signal is received by the central office using its 1.3 μm RX unit. Since upstream transmission is in TDM mode, where each downstream station is assigned a different time slot for sending its upstream signal to the central office, the central office can determine which downstream station sent which upstream signal by identifying the time slot in which the upstream signal was sent.

Figure 2:
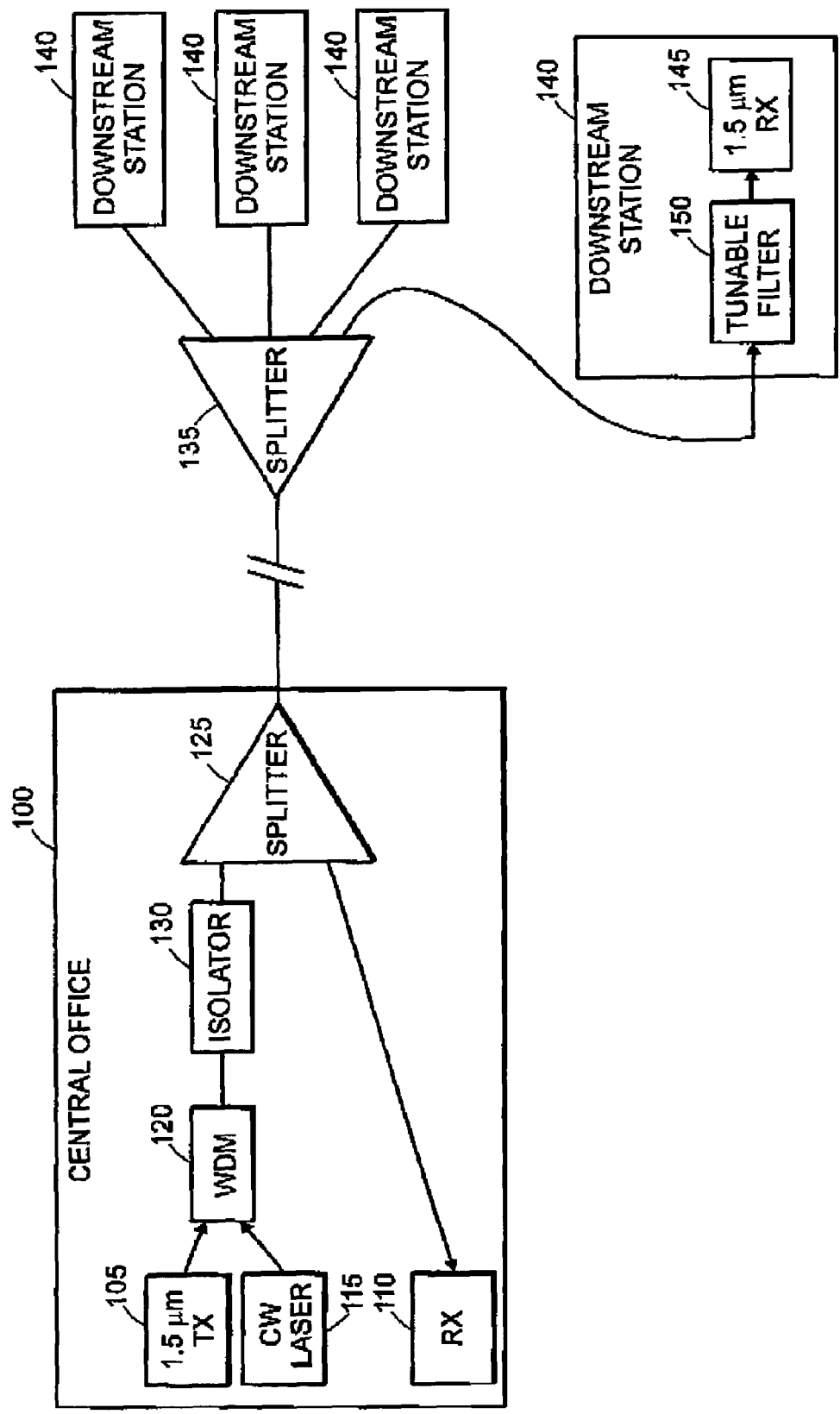
FIG. 2 is a schematic diagram of a novel system formed in accordance with the present invention.

Looking now at FIG. 2, there is shown a novel fiberoptic system formed in accordance with the present invention. The novel system includes a central office unit 100 which includes a 1.5 μm TX unit 105, an RX unit 110, a CW laser 115, a wavelength division multiplexer ("WDM") 120 for combining the output of TX unit 105 and CW laser 115, and a splitter 125. An isolator 130 is positioned between splitter 125 and WDM 120. The central office's RX unit 110 is adapted to detect light at the wavelength of CW laser 115, whereby RX unit 110 will be able to detect modulated reflections of CW laser 115, as will hereinafter be discussed.

At the downstream end, a splitter 135 is used to connect a plurality of downstream stations 140. Each downstream station 140 includes a 1.5 μm RX unit 145 and a tunable filter 150. As shown in FIG. 2, the downstream station's tunable filter 150 is placed between RX unit 145 and splitter 135.

Tunable filter 150 is constructed so that when the filter is tuned to a selected wavelength, it will pass light of that wavelength and reflect light at other wavelengths. The present invention uses this feature to modulate a return path transmission, as will hereinafter be discussed in further detail.

By way of example but not limitation, tunable filter 150 may comprise a tunable filter of the sort disclosed in U.S. Pat. No. 6,438,149 by Paviz Tayebati et al. for MICRO-ELECTROMECHANICALLY TUNABLE, CONFOCAL, VERTICAL CAVITY SURFACE EMITTING LASER AND FABRY-PEROT FILTER, or tunable filter 150 may comprise a tunable filter of the sort disclosed in U.S. Pat. No. 6,584,126 by Peidong Wang et al. for TUNABLE FABRY-PEROT FILTER AND TUNABLE VERTICAL CAVITY SURFACE EMITTING LASER, both of which aforementioned patents are hereby incorporated herein by reference.

During downstream transmission, the central station's TX unit 105 operates in broadcast mode, at 1.5 μm, to send out an optical transmission which is split and sent to each downstream station 140. During downstream transmission, the downstream station's tunable filter 150 is tuned to the wavelength of TX unit 105, i.e., 1.5 μm, so that the signal transmitted by the central office will pass through tunable filter 150 and be received by the downstream station's RX unit 145.

Upstream transmission is in TDM mode, and is achieved by using each downstream station's tunable filter 150 to create a modulated reflection of CW laser 115 during that downstream station's assigned TDM time slot. This modulated reflection is then detected by the central office's RX unit 110.

Figure 3:
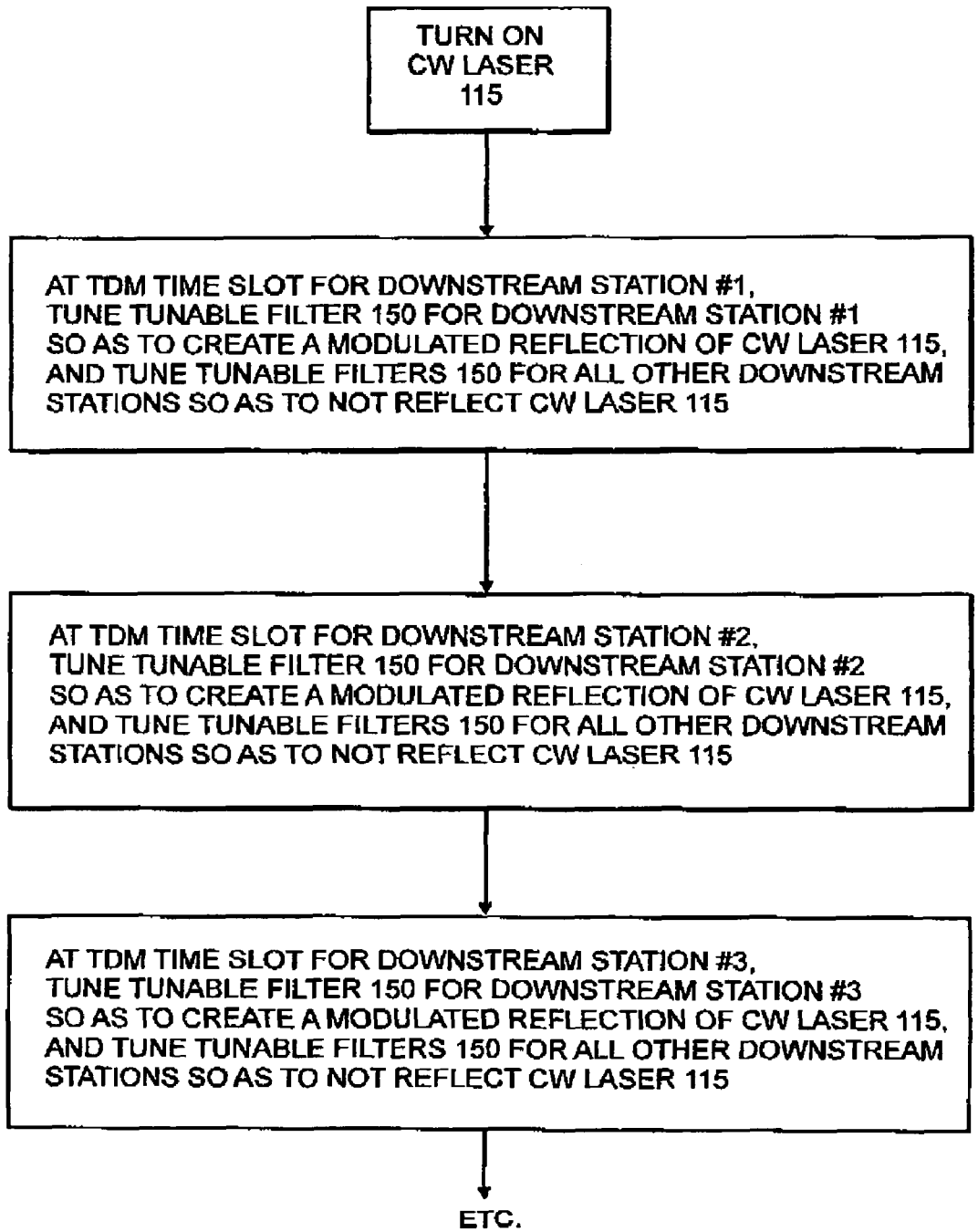
FIG. 3 is a schematic diagram illustrating upstream transmission in TDM mode with the present invention.

More particularly, during upstream transmission, the CW laser 15 at central office 100 sends out a stream of light. At the designated time slot for downstream station #1, that downstream station's tunable filter 150 is selectively tuned so as to selectively reflect light from CW laser 115 back to the central office's RX unit 110. By selectively tuning that downstream station's tunable filter 150 relative to the wavelength of CW laser 115, the tunable filter can be used to modulate the light being reflected back to the central office 100, whereby to effectively create an upstream transmission from that downstream station #1 to the central office. At the same time that this is being done, during the designated TDM time slot for downstream station #1, the tunable filters 150 for all of the other downstream stations 140 are set so as to not reflect light back to central office 100. Thus, during the designated time slot for downstream station #1, any reflected light returning to central office 100 will be the light being reflected by downstream station #1, and this light will be appropriately modulated so as to carry the upstream transmission from downstream station #1 to central station 100. This process is then repeated for each of the downstream stations 140, so that upstream transmission can be achieved. See FIG. 3.

In one preferred form of the invention, CW laser 115 is a tunable laser adapted to emit light at selected wavelengths (e.g., selected wavelengths between 1510 nm and 1600 nm), and each downstream station 140 has its own designated wavelength (i.e., one of the wavelengths of CW laser 115 will transmit, during the allocated time slot for a given downstream station, light at the appropriate wavelength for that given downstream station 140, whereby the tunable filter for that given station may appropriately modulate the reflected light signal.

Various advantages are achieved through the use of the present invention. Among other things, the system is generally less expensive to implement than the aforementioned ATM-PON system, since it replaces TX unit 45 (FIG. 1) and splitter 50 with a tunable filter 150 (FIG. 2), and the cost of CW laser 115 (FIG. 2) and WDM 120 in the central office is shared among the various downstream stations 140 (e.g., typically 16 to 32 such downstream stations).

It will be understood that the foregoing detailed description of the preferred embodiment of the invention has been presented by way of illustration and not limitation. Various modifications, variations, changes, adaptations and the like will occur to those skilled in the art in view of the foregoing specification. Accordingly, the present invention should be understood as being limited only by the terms of the claims.

What is claimed is:

1. A fiberoptic system comprising:
    a central office; and
    at least one downstream station connected to said central office by a bi-directional fiber;
    said central office comprising a TX unit, an RX unit and a CW laser; and
    each said downstream station comprising an RX unit and a tunable filter, said tunable filter being placed between the downstream station's RX unit and said central office to selectively reflect a signal received from the CW laser on the bi-directional fiber back to the central office on the bi-directional fiber, such that during upstream transmission the station's tunable filter is selectively tuned to a wavelength different than the wavelength of the central office's CW laser, so that the station's tunable filter will selectively reflect light from the CW laser back to the central office, with said tunable filter being selectively tuned so as to modulate the light being reflected back to the central office,
    whereby an upstream transmission from the downstream station to the central office is effectively created.

2. A fiberoptic system according to claim 1 wherein said tunable filter is configured so that during downstream transmission, said tunable filter is tuned to the wavelength of the central office's TX unit so that the signal transmitted by the central office will pass through said tunable filter and be received by the station's RX unit.

3. A fiberoptic system according to claim 1 wherein said CW laser is a tunable laser, and each said downstream station is assigned a different wavelength within the tuning range of said tunable laser.

4. A fiberoptic system comprising:
    a central office; and
    a least one downstream station connected to said central office by a bi-directional fiber;
    said central office comprising means for transmitting a light signal on the bi-directional fiber, means for receiving a light signal on the bi-directional fiber, and a CW laser; and
    each said downstream station comprising means for receiving a light signal and a tunable filter, said tunable filter being placed between the downstream station's means for receiving a light signal and said central office, the tunable filter for selectively reflecting a signal received from the central office on the bi-directional fiber back to the central office on the bi-directional fiber, such that during upstream transmission the station's tunable filter is selectively tuned to a wavelength different than the wavelength of the central office's CW laser, so that the station's tunable filter will selectively reflect light from the CW laser back to the central office, with said tunable filter being selectively tuned so as to modulate the light being reflected back to the central office,
    whereby an upstream transmission from the downstream station to the central office is effectively created.

5. A method for communicating between a central office and a downstream station coupled to the central office by a bi-directional fiber, said method comprising:
    providing, at said central office, a TX unit, an RX unit and a CW laser, and providing, at said downstream station, an RX unit and a tunable filter, said tunable filter being placed between the downstream station's RX unit and said central office;
    during downstream transmission, tuning said tunable filter to the wavelength of the central office's TX unit so that a signal transmitted by the central office on the bi-directional fiber will pass through said tunable filter and be received by the station's RX unit, and during upstream transmission, selectively tuning the station's tunable filter to a wavelength different than the wavelength of the central office's CW laser, so that the station's tunable filter will selectively reflect light received from the CW laser on the bi-directional fiber back to the central office on the bi-directional fiber, with said tunable filter being selectively tuned so as to modulate the light being reflected back to the central office, whereby to effectively create an upstream transmission from the downstream station to the central office.

* * * * *